(12) United States Patent
Fukumitsu et al.

(10) Patent No.: US 9,862,034 B2
(45) Date of Patent: Jan. 9, 2018

(54) ROUND HOLE MACHINING METHOD AND ROUND HOLE MACHINING DEVICE

(71) Applicant: HONDA MOTOR CO., LTD., Tokyo (JP)

(72) Inventors: Jin Fukumitsu, Tochigi (JP); Kenji Mori, Tochigi (JP); Akihiro Nemoto, Tochigi (JP); Takuro Kidani, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 235 days.

(21) Appl. No.: 14/908,025

(22) PCT Filed: Jul. 29, 2014

(86) PCT No.: PCT/JP2014/069958
§ 371 (c)(1),
(2) Date: Jan. 27, 2016

(87) PCT Pub. No.: WO2015/016224
PCT Pub. Date: Feb. 5, 2015

(65) Prior Publication Data
US 2016/0167138 A1 Jun. 16, 2016

(30) Foreign Application Priority Data

Jul. 30, 2013 (JP) ................................. 2013-157557

(51) Int. Cl.
*G06F 19/00* (2011.01)
*B23B 41/12* (2006.01)
(Continued)

(52) U.S. Cl.
CPC ........ *B23B 41/12* (2013.01); *B23B 29/03478* (2013.01); *B23B 41/04* (2013.01);
(Continued)

(58) Field of Classification Search
CPC ...... G05B 19/4097; G05B 2219/36201; G05B 2219/37518; B23B 41/12; B23B 41/04;
(Continued)

(56) References Cited

U.S. PATENT DOCUMENTS 4,009,968 A 3/1977 Vandenkieboom
5,812,402 A * 9/1998 Nishiyama ......... G05B 19/4099
425/130
(Continued)

FOREIGN PATENT DOCUMENTS

EP 2 796 697 A1 10/2014
JP 60-191737 9/1985
(Continued)

OTHER PUBLICATIONS

Ee, K. C., O. W. Dillon, and I. S. Jawahir. "Finite element modeling of residual stresses in machining induced by cutting using a tool with finite edge radius." International Journal of Mechanical Sciences 47.10 (2005): 1611-1628.*
(Continued)

*Primary Examiner* — Michael D Masinick
(74) *Attorney, Agent, or Firm* — Rankin, Hill & Clark LLP

(57) ABSTRACT

A round hole machining method and a round-hole machining device in which machining can be accurately performed regardless of a residual stress caused by casting. An out-of-round hole machining device, which carries out inner diameter machining for a bore in a cast cylinder block includes the following: a stress deformation amount correspondence table that stores, for each portion of the cylinder block, a stress deformation amount based on stress that resides in the cylinder block during casting; a machining shape prediction section that predicts the machining shape on the basis of the stress deformation amount read from the stress deformation
(Continued)

amount correspondence table; and a motor control unit that reverses the predicted machining shape with respect to a target shape and carries out reverse machining on a workpiece.

16 Claims, 8 Drawing Sheets

(51) Int. Cl.
*B23B 29/034* (2006.01)
*B23B 41/04* (2006.01)
*F02F 7/00* (2006.01)
*G05B 19/4097* (2006.01)

(52) U.S. Cl.
CPC .......... *F02F 7/0007* (2013.01); *F02F 7/0095* (2013.01); *G05B 19/4097* (2013.01); *B23B 2215/242* (2013.01); *G05B 2219/36201* (2013.01); *G05B 2219/37518* (2013.01)

(58) Field of Classification Search
CPC ......... B23B 29/03478; B23B 2215/242; F02F 7/0095
See application file for complete search history.

(56) References Cited

U.S. PATENT DOCUMENTS

| | | | |
|---|---|---|---|
| 6,136,235 A * | 10/2000 | Saito | B29C 45/768 264/328.12 |
| 6,572,796 B1 * | 6/2003 | Gao | B29C 45/76 264/328.1 |
| 7,024,342 B1 * | 4/2006 | Waite | B22D 17/32 700/118 |
| 7,513,237 B1 * | 4/2009 | Liebert | F02F 1/102 123/195 H |
| 8,424,426 B2 * | 4/2013 | Kume | B23B 41/04 408/1 R |
| 9,138,929 B2 * | 9/2015 | Heitzer | B29C 45/7693 |
| 9,489,620 B2 * | 11/2016 | Wang | C22F 1/04 |
| 2009/0129879 A1 | 5/2009 | Sadaoka et al. | |
| 2011/0023667 A1 * | 2/2011 | Kume | B23B 41/04 82/1.3 |
| 2012/0035891 A1 * | 2/2012 | Heitzer | B29C 45/7693 703/1 |
| 2015/0356402 A1 * | 12/2015 | Wang | C22F 1/04 706/21 |
| 2016/0167138 A1 * | 6/2016 | Fukumitsu | B23B 41/12 700/160 |

FOREIGN PATENT DOCUMENTS

| | | |
|---|---|---|
| JP | 07-040195 | 2/1995 |
| JP | 2001-125613 | 5/2001 |
| JP | 2007-313619 | 12/2007 |
| JP | 2008-40588 | 2/2008 |
| WO | 2009/125638 | 10/2009 |
| WO | 2013/094324 | 4/2015 |

OTHER PUBLICATIONS

Nasr, Mohamed NA, E-G. Ng, and M. A. Elbestawi. "Modelling the effects of tool-edge radius on residual stresses when orthogonal cutting AISI 316L." International Journal of Machine Tools and Manufacture 47.2 (2007): 401-411.*
International Search Report, dated Oct. 21, 2014 (Oct. 21, 2014).

* cited by examiner

FIG. 10
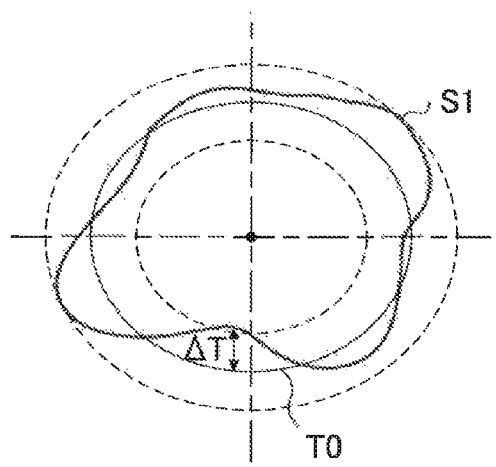
(a)
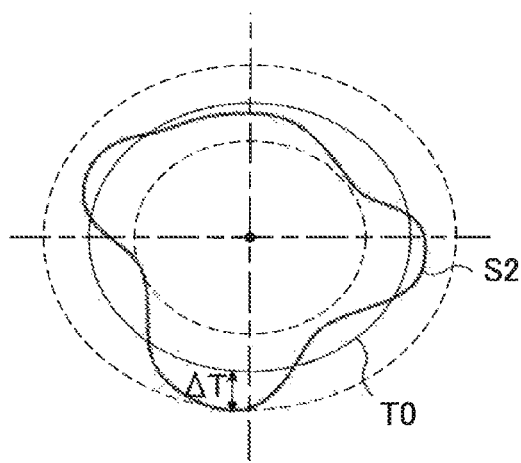
(b)
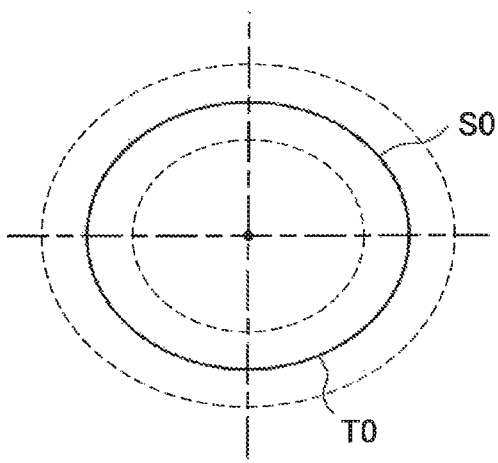
(c)

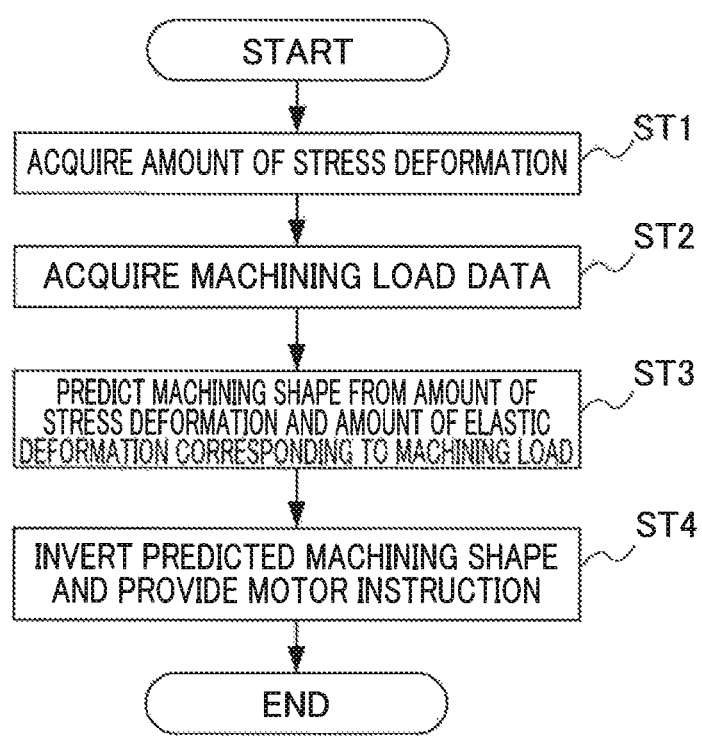

ROUND HOLE MACHINING METHOD AND ROUND HOLE MACHINING DEVICE

TECHNICAL FIELD

The present invention relates to a round hole machining method and a round-hole machining device.

BACKGROUND ART

Conventionally, in a process of manufacturing an automobile, a bore in a cylinder block in an engine is formed by cutting machining, and thereafter a cylinder head, a crankcase and the like are assembled to the cylinder block.

Here, since a piston held in the bore is formed in cross section in a round shape, the cutting machining is performed such that the cross-sectional shape of the bore is close to a circle.

However, even when the bore of the cylinder block is machined in a cross section round shape, the shape of the bore is deformed when the cylinder head, the crankcase and the like are assembled. The bore deforming as described above causes an increase in the sliding resistance between the bore and the piston at the time of using the engine, and thus it is likely that the engine cannot achieve desired performance.

Hence, when the bore of the cylinder block is machined, a dummy head imitating the cylinder head attached to machine the bore and the dummy head is removed when the machining of the bore is completed.

However, when the dummy head and the like are attached and removed each time the bore of the cylinder block is machined, productivity is lowered disadvantageously and significantly.

In order to solve this problem, the following method is proposed (see Patent Documents 1 and 2). Specifically, the dummy head is first fitted to the cylinder block, and the bore is machined in cross section in a round shape with a machine tool. Then, the dummy head is removed from the cylinder block. Then, since a stress caused by the assembly of the dummy head is eliminated, the shape of the bore is deformed, and its cross section is formed in a non-round shape. The overall shape of the bore which is formed in a cross section non-round shape is measured, and the NC data thereof is generated.

Specifically, with respect to the NC data, on the bore from which the dummy head is removed and which is formed in a cross section non-round shape, along the axis line of the bore, measurement points are set at predetermined intervals, and the cross-sectional shape of the bore is measured at each of the measurement points.

Thereafter, based on the generated NC data, boring machining is performed, without the dummy head being fitted, on the cylinder block which is not machined, and thus the bore in a non-round shape is formed.

In this way, even when the bore is machined without the dummy head being attached to the cylinder block, the bore is formed in a round shape when the cylinder head is fitted.

Patent Document 1: Japanese Unexamined Patent Application, Publication No. 2007-313619

Patent Document 2: PCT International Publication No. WO2009/125638

DISCLOSURE OF THE INVENTION

Problems to be Solved by the Invention

By the method disclosed in Patent Documents 1 and 2, it is possible to machine the bore of the cylinder block such that the bore is formed in a round shape when the cylinder head is fitted. However, in recent years, it has been required to further enhance the accuracy of machining. Specifically, although the cylinder block is molded (cast) by pouring, into a mold, a metal such as an aluminum alloy heated to a high temperature and cooling it, a stress is left in the cylinder block at the time of casting, and the residual stress is released by boring (cutting) machining, with the result that the accuracy of the machining is lowered.

With respect to this point, in the methods disclosed in Patent Documents 1 and 2, attention focused on a deformation caused by the fitting of a cylinder heat but consideration is not given to a stress caused by casting.

Here, although it can be considered that in order for the accuracy of the machining to be prevented from being lowered by a stress caused by casting, an allowance for cutting is decreased, and thus an effect of the release of the stress is unlikely to be received, other steps are affected by the decrease of the allowance. Specifically, for example, it is necessary to divide the cutting step into a plurality of steps such as a roughening step and a finishing step, and it is necessary to increase an allowance for a polishing step performed after the cutting step, with the result that the overall cycle time is increased.

The present invention is made in view of such a problem, and an object of the present invention is to provide a round hole machining method and a round-hole machining device in which machining can be accurately performed regardless of a residual stress caused by casting.

Means for Solving the Problems (1) A round hole machining method of performing inside diameter machining on a cast work (e.g., a cylinder block which will be described later), where first master data (e.g., a stress deformation amount correspondence table 406 which will be described later) storing an amount of stress deformation per part of the cast work is provided, and round hole machining method includes: a step (e.g., a step performed by a machining shape prediction section 402 which will be described later) of predicting, in the inside diameter machining, a machining shape of the cast work based on the amount of stress deformation read from the first master data; and a step (e.g., a step performed by a motor control section 403 which will be described later) of performing the inside diameter machining on the cast work such that an inverted shape obtained by inverting the machining shape predicted in the step with respect to a target shape is formed.

In the round hole machining method according to (1), the amount of stress deformation per part of the cast work is previously provided as the first master data, and thus it is possible to predict how much the cast work is deformed by a stress in the inside diameter machining. Then, the shape is inverted with respect to the target shape only by the previously predicted stress deformation, and the inside diameter machining is performed on the cast work. In this way, it is possible to cancel out an error based on a stress caused at the time of casting, and thus it is possible to enhance the accuracy of the inside diameter machining. Since it is not necessary to decrease the allowance for the cutting to reduce a stress to be released, it is possible to reduce a cycle time, with the result that it is possible to enhance the productivity.

(2) The round hole machining method according to (1) further including: a step (e.g., a step performed by a machining load data acquisition section 404 which will be described later) of acquiring, in the inside diameter machining, machining load data corresponding to a machining load placed on an edge (e.g., an edge of a cutting tool 13 which will be described later), where in the step of predicting the machining shape of the cast work, the machining shape of the cast work is predicted based on an amount of elastic deformation of the cast work corresponding to the machining load data and the amount of stress deformation.

In the round hole machining method according to (2), the machining load data corresponding to the machining load placed on the edge is acquired, and by this machining load data, the elastic deformation caused on the work is added, and the machining shape of the work is predicted. Then, the predicted machining shape is inverted with respect to the target shape, and machining is performed on the work. In this way, it is possible to cancel out not only a stress caused at the time of casting but also an error based on the elastic deformation caused on the work as the machining load is increased. Consequently, regardless of the degree of the wear of the edge, it is possible to accurately machine the round hole on the work.

It is also possible to reduce the frequency of replacement of the edge, and thus it is possible to reduce the cost. Since it is not necessary to decrease the allowance for the cutting according to the degree of the wear of the edge, it is possible to reduce a cycle time, with the result that it is possible to enhance the productivity.

(3) The round hole machining method according to (2), where in the step of acquiring the machining load data, the machining load data is acquired based on a variation in torque which immediately proceeds when cast work is machined.

In the round hole machining method according to (3), since it is possible to calculate the machining load data from a variation in the torque by a predetermined computation, it is not necessary to previously prepare the master data.

(4) The round hole machining method according to (2), where second master data (e.g., a machining number load correspondence table 407 which will be described later) in which a number of cast works machined is associated with a machining load corresponding to an amount of wear of the edge is provided, and in the step of acquiring the machining load data, the machining load data is acquired by reading the machining load corresponding to the number of cast works machined from the second master data.

In the round hole machining method according to (4), once appropriate master data is prepared, it is possible to automatically perform the machining.

(5) The round hole machining method according to any one of (1) to (4), where the inside diameter machining is performed by using an edge tool for boring.

In the round hole machining method according to (5), when the machining is performed by using the edge tool for boring whose edge is remarkably worn, regardless of the wear of the edge, it is possible to enhance the accuracy of the machining, and thus this is preferable.

(6) A round hole-machining device (e.g., a non-round hole machining device 1 which will be described later) for performing inside diameter machining on a cast work (e.g., a cylinder block which will be described later), the round hole-machining device including: first master data (e.g., a stress deformation amount correspondence table 406 which will be described later) for storing an amount of stress deformation per part of the cast work; a machining shape prediction section (e.g., a machining shape prediction section 402 which will be described later) for predicting, in the inside diameter machining, a machining shape of the cast work based on the amount of stress deformation read from the first master data; and a motor control section (e.g., a motor control section 403 which will be described later) for performing the inside diameter machining on the cast work such that an inverted shape obtained by inverting the machining shape predicted with respect to a target shape is formed.

(7) The round hole-machining device according to (6) further including: a machining load data acquisition section (e.g., a machining load data acquisition section 404 which will be described later) for acquiring, in the inside diameter machining, machining load data corresponding to a machining load placed on an edge, where the machining shape prediction section predicts the machining shape of the cast work based on an amount of elastic deformation of the cast work corresponding to the machining load data and the amount of stress deformation.

(8) The round hole-machining device according to (7), where the machining load data acquisition section acquires the machining load data based on a variation in torque when an immediately preceding cast work is machined.

(9) The round hole-machining device according to (7), where second master data (e.g., a machining number load correspondence table 407 which will be described later) in which a number of cast works machined is associated with a machining load corresponding to an amount of wear of the edge is provided, and the machining load data acquisition section acquires the machining load data by reading the machining load corresponding to the number of cast works machined from the second master data.

(10) The round hole-machining device according to any one of (6) to (9), where the round hole-machining device is a machining device using an edge tool for boring.

In the round-hole machining devices of (6) to (10), the same effects as (1) to (5) are achieved.

Effects of the Invention

In the present invention, machining can be accurately performed on a work regardless of a residual stress caused by casting.

BRIEF DESCRIPTION OF THE DRAWINGS

FIGS. 10(a) to 10(c) are cross-sectional views of a machining shape predicted from the stress deformation and the elastic deformation of the work, an inverted shape obtained by inverting the machining shape with respect to a target shape and the target shape of the work; and FIG. 11 is a flowchart showing the flow of the processing of the non-round hole machining device according to the embodiment.

PREFERRED MODE FOR CARRYING OUT THE INVENTION

An embodiment of the present invention will be described below with reference to drawings.

Figure 1:
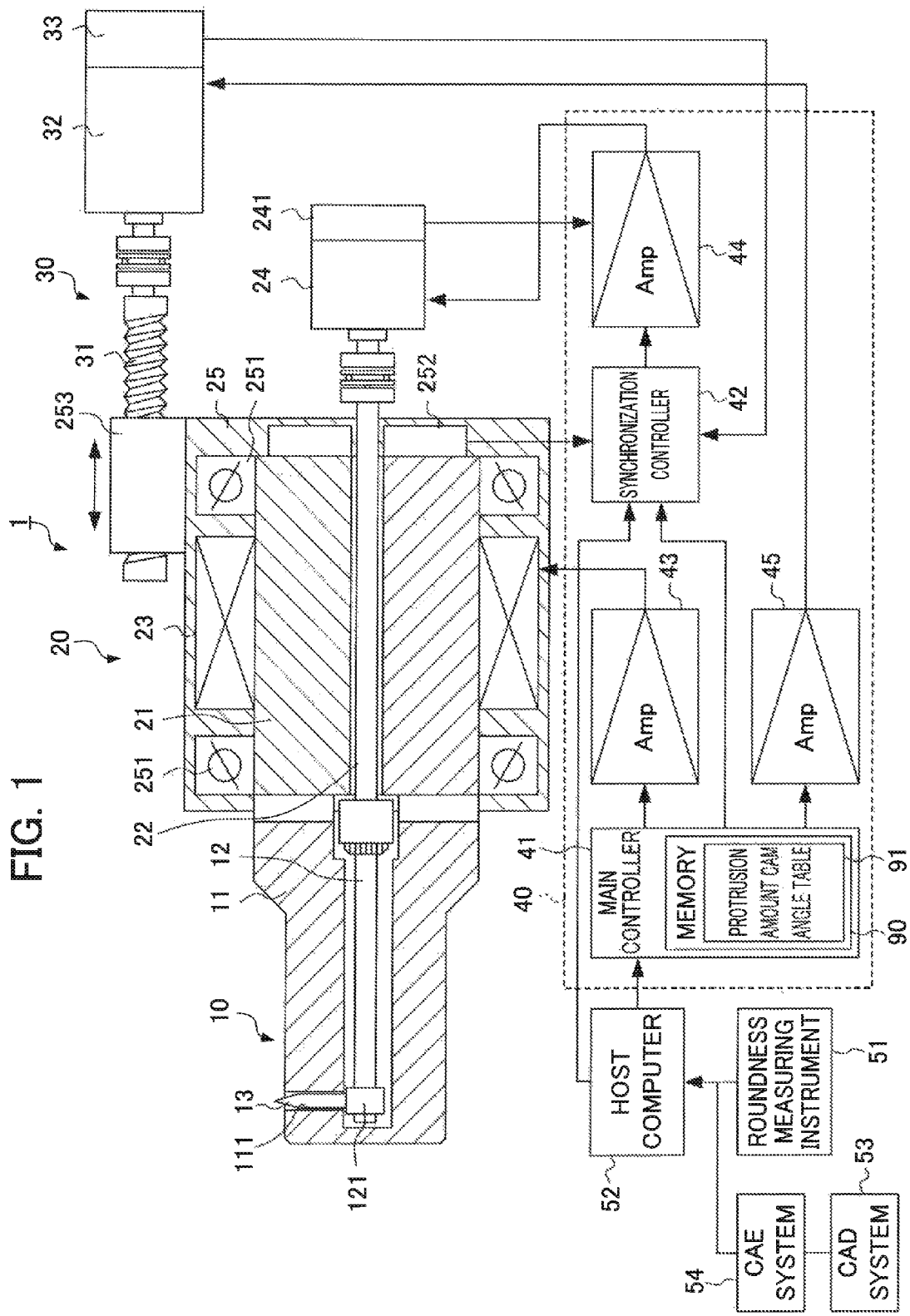
FIG. 1 is a schematic configuration diagram of a non-round hole machining device according to an embodiment of the present invention.

FIG. 1 is a schematic configuration diagram of a non-round hole machining device 1 according to the embodiment of the present invention.

For example, the non-round hole machining device 1 inserts, as a work, a machining head 10 into the cylinder block of an automobile engine, and performs boring machining.

The non-round hole machining device 1 includes a rotation drive mechanism 20 which rotates the machining head 10, a retracting mechanism 30 which retracts the rotation drive mechanism 20, a controller 40 which controls them, a roundness measuring device 51 which measures the inside diameter shape of the bore of the work and a host computer 52 which analyzes the measurement results of the roundness measuring device 51 to output them to the controller 40.

A CAE system 54 which performs simulation analysis on the work and a CAD system 53 which designs the work are connected to the host computer 52.

The rotation drive mechanism 20 includes a cylindrical arbor 21, a shaft 22 which is held within the arbor 21, an arbor motor 23 which drives and rotates the arbor 21, a shaft motor 24 which drives and rotates the shaft 22 and a housing 25 which holds the arbor motor 23.

Here, the rotation shaft of the arbor 21 is coaxial with the rotation shaft of the shaft 22.

In the housing 25, in addition to the arbor motor 23, a bearing 251 which rotatably retains the arbor 21, a first rotary encoder 252 which detects the rotation speed and the rotation angle of the arbor 21 and a nut portion 253 which is screwed to the retracting mechanism 30 are provided.

In the shaft motor 24, a second rotary encoder 241 which detects the rotation speed and the rotation angle of the shaft 22.

The retracting mechanism 30 has a feed screw mechanism, and includes a shaft portion 31 in which a screw is inscribed, a retracting motor 32 which drives and rotates the shaft portion 31 and a third rotary encoder 33 which detects the rotation speed and the rotation angle of the shaft portion 31. The shaft portion 31 is screwed to the nut portion 253 of the housing 25.

In the retracting mechanism 30, the retracting motor 32 is driven to rotate the shaft portion 31, and thus it is possible to retract the rotation drive mechanism 20.

The machining head 10 includes a cylindrical arbor 11 which is coupled integrally with the arbor 21, a shaft 12 which is held within the arbor 11 and which is coupled integrally with the shaft 22 and a cutting tool 13 which is provided on the outer circumferential surface of the arbor 11 such that it can be protruded and recessed.

In the tip end side of the arbor 11, a through hole 111 is formed which is extended in a direction intersecting rotation shaft of the arbor 11.

The cutting tool 13 is formed in the shape of a bar, and a force acting toward the shaft 12 is applied to the cutting tool 13 by an unillustrated force application means.

Figure 2:
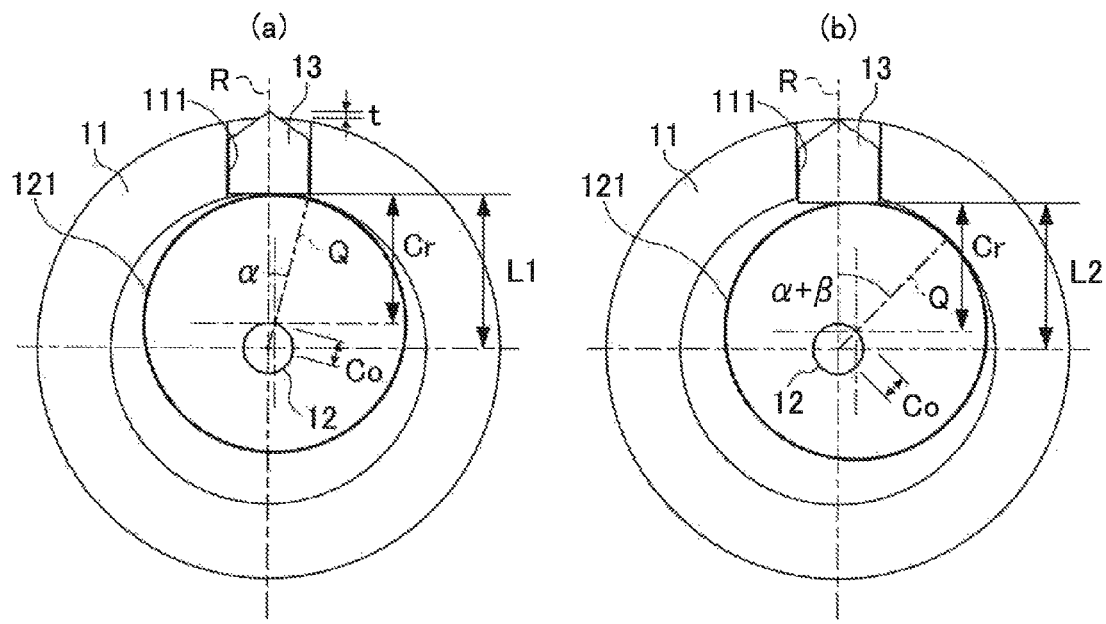
FIG. 2 is a schematic diagram showing the amount of protrusion of a cam in the non-round hole machining device according to the embodiment.

As shown in FIG. 2, in the shaft 12, a cam 121 is provided which presses the cutting tool 13 in a direction in which it is protruded.

The cam 121 is formed in, for example, a round shape, and the shaft 12 is provided in a position displaced from the center of the round shape. In this way, the distance from the center of the rotation of the shaft 12 to the circumferential edge of the cam 121 is continuously changed.

Although the shape of the cam 121 is not limited to a round shape, a round shape is preferable so as to reduce the cost.

The base end edge of the cutting tool 13 makes contact with the circumferential edge of the cam 121. Hence, the angle of the shaft 12 with respect to the arbor 11 is changed, and thus the part of the circumferential edge of the cam 121 which makes contact with the cutting tool 13 is changed, with the result that the amount of protrusion of the cutting tool 13 from the outer circumferential surface of the arbor 11 is changed.

FIG. 2(a) is a schematic diagram showing a state where the amount of protrusion of the cam 121 is t, and FIG. 2(b) is a schematic diagram showing a state where the amount of protrusion of the cutting tool 13 is zero.

In FIG. 2, it is assumed that a straight line extending from the center of the rotation of the cam 121 to the part of the circumferential edge of the cam 121 which is farthest from the shaft 12 is a reference line Q of the cam 121, and that a straight line passing through the center axis of the cutting tool 13 is a reference line R of the cutting tool 13. Then, it is assumed that an angle formed between the reference line Q of the cam 121 and the reference line R of the cutting tool 13 is a cam angle.

In the state where the amount of protrusion of the cutting tool 13 is t, the cam angle is α. This α is assumed to be the initial angle. On the other hand, in the state where the amount of protrusion of the cutting tool 13 is zero, the cam angle is (α+β).

When it is assumed that the radius of the cam 121 is Cr, and that an offset dimension from the center of the cam 121 to the center of the rotation thereof is Co, the maximum dimension L1 and the minimum dimension L2 from the center of the rotation of the cam 121 to the base end edge of the cutting tool 13 are expressed by formulas (1) and (2) below.

$$L1 = Co \times \cos(\alpha) + Cr \tag{1}$$

$$L2 = Co \times \cos(\alpha + \beta) + Cr \tag{2}$$

In this way, the stroke of the cam angle is β (swing angle), and the stroke of the amount of protrusion of the cutting tool 13 is t, with the result that formula (3) below holds true.

$$t = L1 - L2 = Co \times \{\cos(\alpha) - \cos(\alpha + \beta)\} \tag{3}$$

Figure 3:
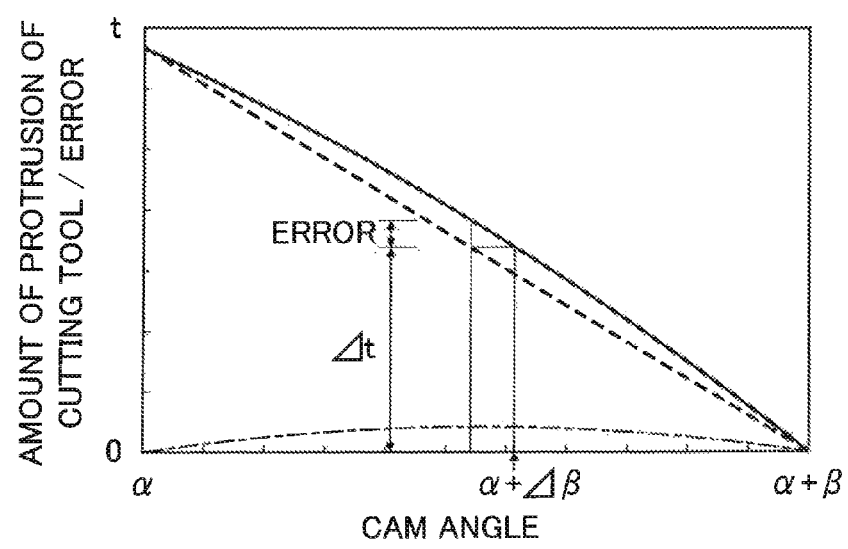
FIG. 3 is a diagram showing a relationship between a cam angle and the amount of protrusion of a cutting tool in the non-round hole machining device according to the embodiment.

Based on formula (3) above, a relationship between the cam angle and the amount of protrusion of the cutting tool is shown in FIG. 3.

As indicated by a solid line in FIG. 3, the amount of protrusion of the cutting tool 13 is changed with a change in the cam angle non-linearly, that is, in the shape of an arc. On the other hand, as indicted by a broken line in FIG. 3, in an ideal cam, the amount of protrusion of the cutting tool is changed linearly (linear). Hence, as compared with the case where the amount of protrusion of the cutting tool is changed linearly (linear), an error in the amount of protrusion of the cutting tool 13 is maximized around the intermediate between the cam angle α (initial angle) and the cam angle (α+β).

Hence, when it is desired to protrude the cutting tool 13 by Δt, the cam angle (α+Δβ) corresponding to the amount of protrusion (Δt) is assumed to be an instruction value of the cam angle. In this way, is possible to easily change the amount of protrusion linearly (linear).

Specifically, for example, a protrusion amount cam angle correspondence table 91 (see FIG. 1) in which the amount of protrusion (Δt) and the instruction value (α+Δβ) of the cam angle are associated with each other is generated, and is previously stored in a memory 90 of a main controller 41, and the instruction value (α+Δβ) is called by a synchronization controller 42, which will be described later. There is no restriction on this configuration, and the protrusion amount cam angle correspondence table 91 may be stored in the synchronization controller 42 itself or may be output from the host computer 52 to the synchronization controller 42.

With reference back to FIG. 1, the controller 40 synchronizes and rotates the arbor 21 and the shaft 22, and advances or delays the phase of the rotation angle of the shaft 22 with respect to the phase of the rotation angle of the arbor 21, and thus it is possible to adjust the amount of protrusion of the cutting tool 13 from the outer circumferential surface of the arbor 11 of the cutting tool 13.

The controller 40 includes the main controller 41, the synchronization controller 42, a first servo amplifier 43, a second servo amplifier 44 and a third servo amplifier 45.

The main controller 41 drives, according to an output from the host computer, through the first servo amplifier 43 and the third servo amplifier 45, the arbor motor 23 and retracting motor 32, and controls the cutting speed and the position on the axial line of the cutting tool 13 with respect to the work. In other words, the main controller 41 is a device that performs the same operation as a so-called NC (numerical) control device. The main controller 41 includes the memory 90 which stores the protrusion amount cam angle correspondence table 91.

The synchronization controller 42 outputs an instruction signal according to the orientation (that is, the rotation angle of the arbor 21) of the cutting tool 13 with respect to the bore of the work and the position (that is, the rotation angle of the shaft portion 31 of the retracting mechanism 30) on the axial line of the cutting tool 13 with respect to the bore of the work. In this way, the shaft motor 24 is driven through the second servo amplifier 44, and the dimension of protrusion (that is, the amount of protrusion of the cutting tool 13 from the outer circumferential surface of the arbor 11) of the cutting tool 13 is adjusted.

Specifically, a map which indicates a relationship between the rotation angle of the arbor 21, the position (that is, the position of the cutting tool 13 on the axial line with respect to the bore of the work) in the direction in which the machining head 10 is retracted and the amount of protrusion of the cutting tool 13 is generated based on the output from the host computer, and this map is stored by the synchronization controller 42 in the memory within the synchronization controller 42. In the map, parameters are aligned.

Specifically, in the map described above, for each position (that is, the position of the cutting tool 13 on the axial line with respect to the bore of the work) in the direction in which in the machining head 10 is retracted, cross-sectional two-dimensional data on the bore indicating the relationship between the rotation angle of the arbor 21 and the amount of protrusion of the cutting tool 13 is determined, and they are aligned in the direction of the axial line.

Then, the synchronization controller 42 drives the shaft motor 24, based on the rotation speed and the rotation angle (specifically, the number of pulses generated by the rotary encoder per unit time, that is, the number of pulses in a sampling time) of the arbor 21 detected by the first rotary encoder 252 and the rotation angle (specifically, the number of pulses generated by the rotary encoder per unit time, that is, the number of pulses in a sampling time) of the shaft portion 31 detected by the intermediate transfer belt 33, with reference to the map stored in the memory within the synchronization controller 42 and indicating the relationship of the amount of protrusion of the cutting tool 13, through the second servo amplifier 44.

Here, the shaft motor 24 is feedback-controlled by the second servo amplifier 44 according to the rotation speed and the rotation angle (specifically, the number of pulses generated by the rotary encoder per unit time, that is, the number of pulses in a sampling time) of the shaft 22 detected by the second rotary encoder 241.

In the non-round hole machining device 1 configured as described above, according to the stress left when the cylinder block is cast, boring machining is performed on the bore of the cylinder block in the automobile engine. The details thereof will be described below.

Figure 4:
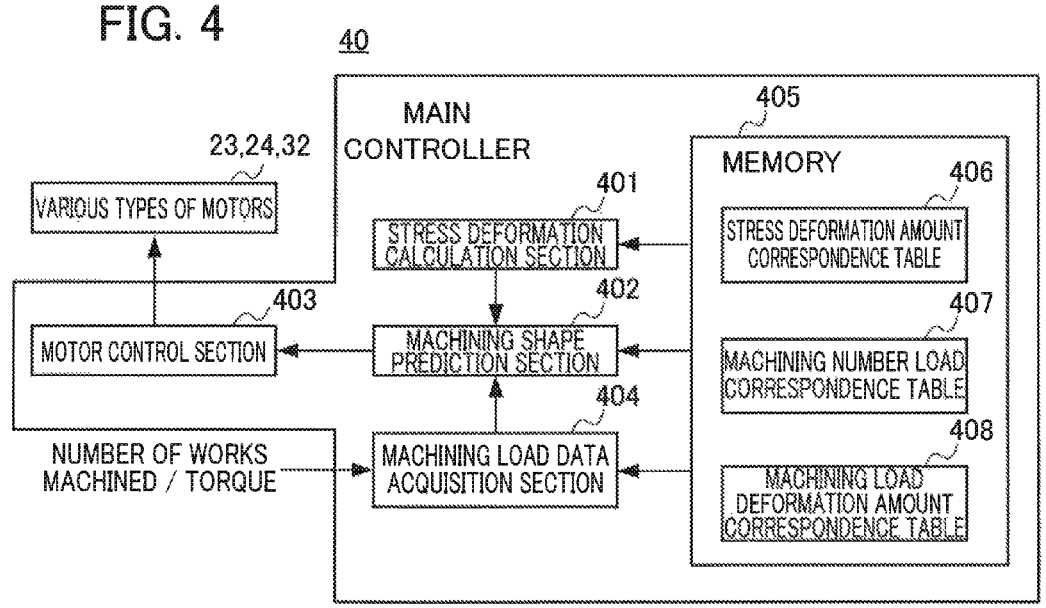
FIG. 4 is a block diagram showing the functional configuration f a control device in the non-round hole machining device according to the embodiment.

FIG. 4 is a block diagram showing the functional configuration of the controller 40. The configuration which will be described below may be included in the main controller 41 of the controller 40 or may be included in the synchronization controller 42.

With reference to FIG. 4, the controller 40 is configured to include a stress deformation calculation section 401, a machining shape prediction section 402, a motor control section 403, a machining load data acquisition section 404 and a memory 405. The memory 405 is configured to include a stress deformation amount correspondence table 406, a machining number load correspondence table 407 and a machining load deformation amount correspondence table 408.

The stress deformation calculation section 401 reads the stress released when inside diameter machining is performed on the work by the cutting tool 13 from the stress deformation amount correspondence table 406 (first master data) in the memory 405.

Figure 5:
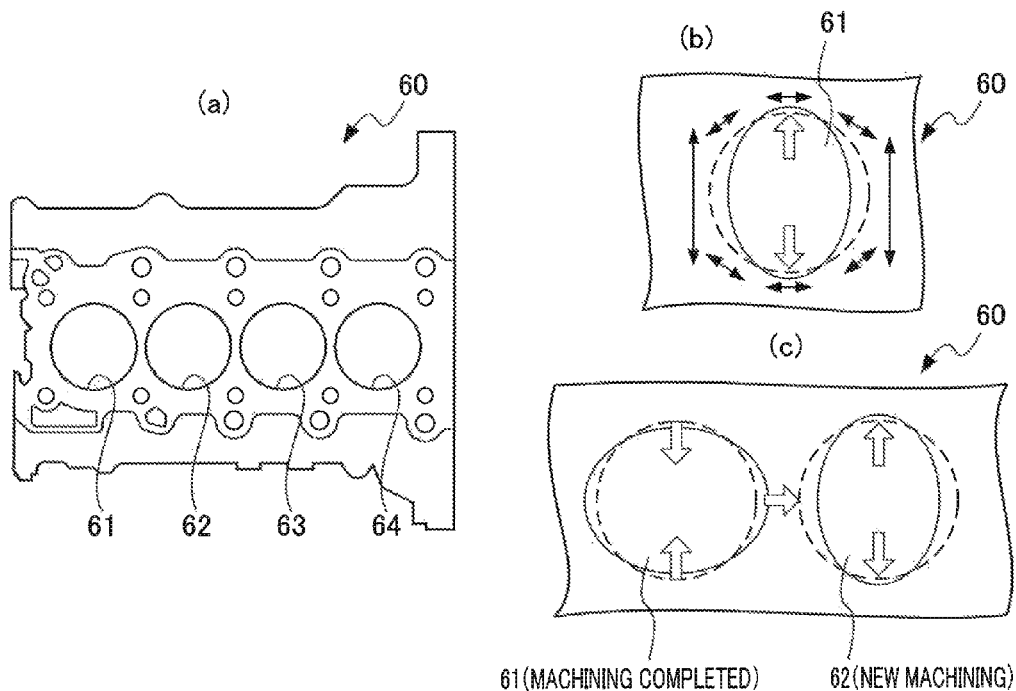
FIG. 5 is a diagram showing a relationship of the stress left on a cast work.

Here, consider, with reference to FIG. 5(*a*), a cylinder block 60 which is formed by linearly aligning four bores 61, 62, 63 and 64. In the cylinder block 60, a tensile residual stress is produced by cooling contraction. The residual stress is released when the inside diameter machining is performed on the bore 61, and as shown in FIG. 5(*b*), a tensile deformation is performed on the bore 61 in a vertical direction. When the inside diameter machining is sequentially performed on a plurality of bores 61, 62, 63 and 64, as the adjacent bore is machined, the other bore is deformed. Specifically, consider a case where the adjacent bore 62 is machined in a state where the bore 61 is already machined. As shown in FIG. 5(C), the bore 62 is pulled in the vertical direction by the release of a stress caused by the inside diameter machining, and is deformed into a vertical ellipse. Since the bore 62 is pulled in the vertical direction, the adjacent bore 61 is pulled in a lateral direction and is deformed into a lateral ellipse.

Figure 6:
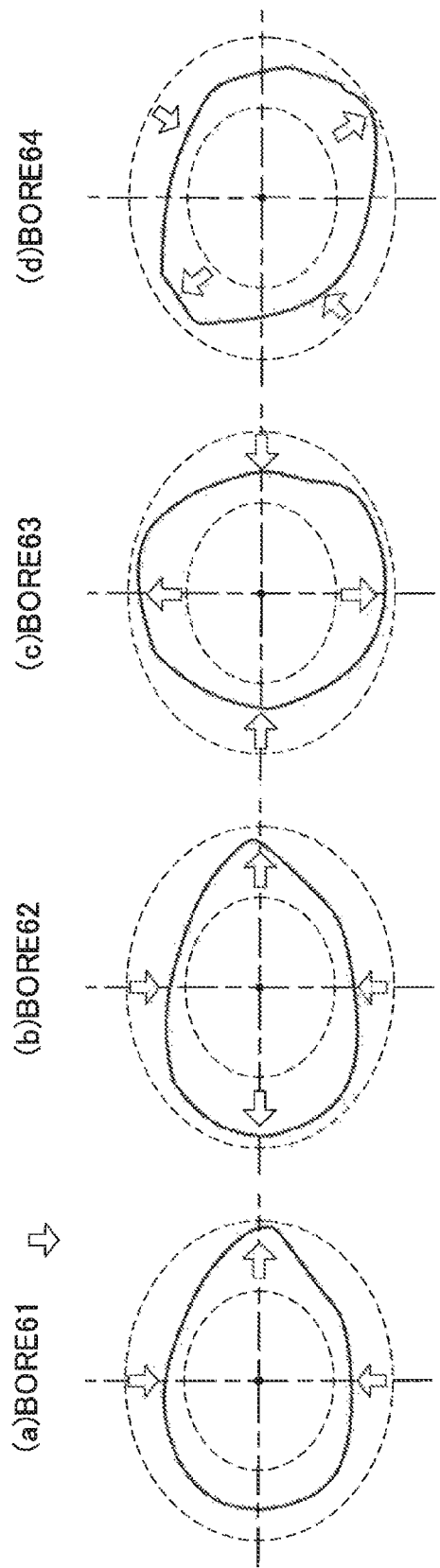
FIG. 6 is a diagram showing an example of stress deformation when four bores are machined in the work.

Although variations in the deformation caused by the casting stress are produced in the casting process, a given tendency is present for each of the bores. Specifically, when the inside diameter machining is performed on the bore 61, the bore 62, the bore 63 and bore 64 in this order, a tendency shown in FIG. 6 is present. In other words, the bore 61 and the bore 62 which are previously machined are pulled in the lateral direction, and are deformed into a lateral ellipse. The pulling in the lateral direction is decreased as the machining is performed, and in the bore 63 and the bore 64, a tendency that pulling in the vertical direction is increased is present. The stress deformation amount correspondence table 406 is a data table in which the amount of deformation per bore caused when a plurality of bores 61, 62, 63 and 64 are machined is stored previously and experimentally. The deformation caused by the casting stress also differs depending on the depth of the work.

Figure 7:
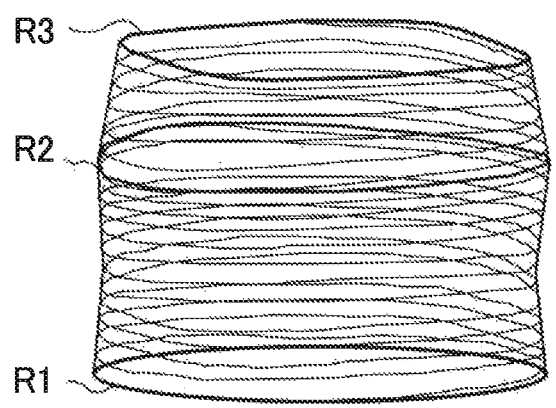
FIG. 7 is a diagram showing a relationship between the stress deformation of the work and the depth of the work.

Specifically, although as shown in FIG. 7, the boring machining is continuously performed down to the depths R1 to R3, the surface (the depths R1 and R3) of the work is more likely to be deformed than the interior (the depth R2) of the work. Hence, the stress deformation amount correspondence table 406 preferably stores, for each depth of the work, the amount of stress deformation per bore. In order to reduce variations in the casting process, the stress deformation amount correspondence table 406 may store the amount of stress deformation per casting lot or per mold.

The machining shape prediction section 402 predicts, based on the amount of stress deformation read from the stress deformation amount correspondence table 406, the machining shape when the inside diameter machining is performed on the bore. In other words, the machining shape prediction section 402 adds the amount of stress deformation to the target shape to be targeted, and thereby predicts the machining shape.

The motor control section 403 controls various types of motors 23, 24 and 32 such that the inverted shape obtained by inverting the machining shape predicted by the machining shape prediction section 402 with respect to the target shape is machined, and thereby performs the inside diameter machining on the work.

By the inverting machining described above, it is possible to cancel out an error caused by the release of a stress on the work (the cylinder block) caused at the time of casting and machining can be accurately performed.

Incidentally, lowering of the accuracy of the machining by the cutting machining is also produced by the wear of the edge of the cutting tool 13. In other words, since in the cutting machining of the cylinder block, the cutting is performed with the edge tool pressed, the work is pressed by the edge tool. The pressing force (hereinafter referred to as the machining load) by the edge tool is increased as the wear of the edge is performed, and the work is elastically deformed, with the result that the accuracy of the machining is lowered.

Hence, in the non-round hole machining device 1 of the present embodiment, not only is stress caused at the time of casting but also the lowering of the accuracy of the machining caused by the machining load produced by the wear of the edge is reduced.

Specifically, the machining load data acquisition section 404 acquires machining load data corresponding to a machining load placed on an edge when the work is machined by the cutting tool 13. Here, the machining load placed on the edge refers to a force with which the cutting tool 13 presses the work, and when the machining load is increased, the torque of the arbor motor 23 is increased. Hence, the machining load data acquisition section 404 monitors the torque of the arbor motor 23 and acquires the machining load data from variations in the torque by a predetermined computation.

When the edge of the cutting tool 13 is worn, since the force which does not cut the work but presses the work is increased, the machining load placed on the edge is increased as the edge of the cutting tool 13 is worn. Here, since the works are the same, the degree of the wear of the edge can be quantitatively calculated so as to be associated with the number of works machined (the number of works machined).

Figure 8:
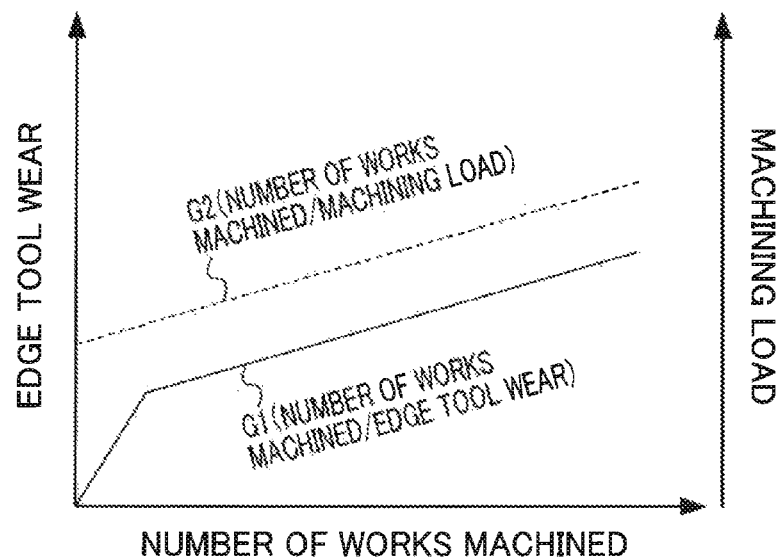
FIG. 8 is a diagram schematically showing a relationship between the number of works machined, the wear of an edge and a machining load.

FIG. 8 is a diagram schematically showing a relationship between the number of works machined, the wear of the edge and the machining load. A correspondence relationship G1 indicates a relationship between the number of works machined and the wear of the edge, and as the number of works machined is increased, the wear of the edge is increased. A correspondence relationship G2 indicates a relationship between the number of works machined and the machining load, and as the number of works machined is increased, the machining load placed on the edge is increased. Such relationships (in particular, the correspondence relationship G2) are previously calculated, and are stored in the memory 405 as the machining number load correspondence table 407 (second master data).

Then, the machining load data acquisition section 404 may acquire the machining load data by reading, from the machining number load correspondence table 407, the machining load corresponding to the number of works machined at present.

Then, the machining shape prediction section 402 utilizes the machining load data acquired by the machining load data acquisition section 404 and rigidity data on the work, and thereby calculates the amount of elastic deformation caused by the machining load. When the machining load data acquisition section 404 acquires the machining load data from the torque of the arbor motor 23, the acquired machining load data is used for the prediction of the machining shape of the work subsequent to the work whose machining load data is acquired.

Figure 9:
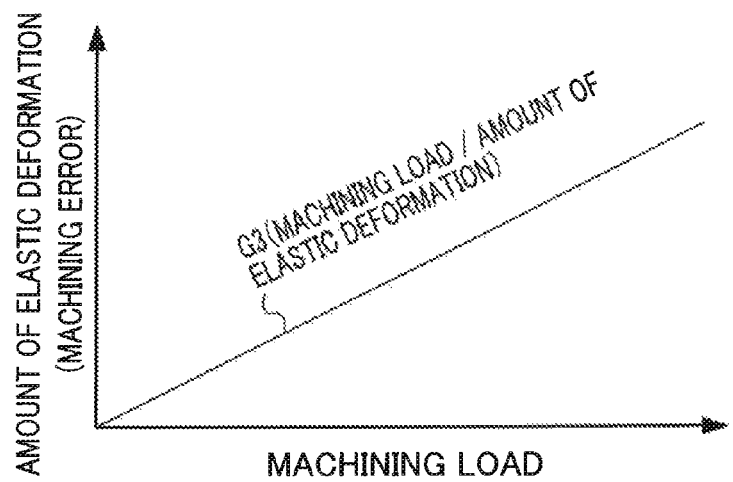
FIG. 9 is a diagram schematically showing a relationship between the machining load and the amount of elastic deformation (rigidity data) of the work.

FIG. 9 is a diagram schematically showing a relationship between the machining load and the amount of elastic deformation (rigidity data) of the work. A correspondence relationship G3 indicates a relationship between the machining load and the amount of elastic deformation of the work, and as the machining load is increased, the amount of elastic deformation is increased. Hence, such a relationship is previously calculated, and is stored in the memory 405 as the machining load deformation amount correspondence table 408.

The amount of elastic deformation of the work is not constant for the works, and differs depending on the part with which the edge of the cutting tool 13 makes contact. Hence, in the machining load deformation amount correspondence table 408, the relationship between the machining load and the amount of elastic deformation is preferably specified for each part on the circumference with which the edge of the cutting tool 13 makes contact.

The amount of elastic deformation of the work differs depending not only on the part of the work on the circumference but also on the depth of the work. Hence, in the machining load deformation amount correspondence table 408, the relationship between the machining load and the amount of elastic deformation is preferably specified for each depth of the work.

The machining shape prediction section 402 reads, from the machining load deformation amount correspondence table 408, the amount of elastic deformation corresponding to the machining load data acquired by the machining load data acquisition section 404. Then, the machining shape prediction section 402 predicts, based on the amount of elastic deformation and the amount of stress deformation read from the stress deformation amount correspondence table 406, the machining shape when the inside diameter machining is performed on the bore. In other words, the machining shape prediction section 402 adds the amount of elastic deformation and the amount of stress deformation to the target shape to be targeted, and thereby predicts the machining shape.

The motor control section 403 controls various types of motors 23, 24 and 32 such that an inverted shape obtained by inverting the machining shape predicted by the machining shape prediction section 402 with respect to the target shape is machined, and performs machining on the work.

FIGS. 10(a) to 10(c) are cross-sectional views of the machining shape of the bore. In FIGS. 10(a) to 10(c), the position (the target shape) of the inner circumferential surface of the bore set at the machining target is assumed to be a reference line T0.

With reference to FIG. 10(a), a description will be given of a machining shape S1 predicted by the machining shape prediction section 402. Due to not only the deformation by the release of the stress but also the elastic deformation corresponding to the machining load, as shown in FIG. 10(a), the machining shape S1 predicted by the machining shape prediction section 402 has a predetermined error with respect to the reference line T0 of the machining target.

Hence, as shown in FIG. 10(b), the motor control section 403 inverts the machining shape S1 with respect to the reference line T0 of the machining target to generate an inverted shape S2. In other words, the part of the machining shape S1 located inward from the reference line T0 by ΔT is inverted with respect to the reference line T0, and thus the part is located outward with respect to the reference line T0 by ΔT.

Then, the motor control section 403 controls various types of motors 23, 24 and 32 such that the inverted shape S2 is machined. In this way, the error based on the release of the stress and the elastic deformation is cancelled out, and thus the target shape S0 (see FIG. 10(c)) substantially coinciding with the reference line T0 is machined, with the result that it is possible to enhance the accuracy of the machining.

A procedure for using the non-round hole machining device 1 configured as described above to perform the boring machining on the bore of the cylinder block in the automobile engine will then be described with reference to the flowchart of FIG. 11.

The stress deformation calculation section 401 first reads the amount of stress deformation per bore from the stress deformation amount correspondence table and acquires it (step ST1). Then, the machining load data acquisition section 404 measures, for each part (circumference and depth), machining load placed on the edge when the work is machined by the cutting tool 13, and thereby acquires the machining load data (step ST2). The acquisition of the machining load data may be calculated from variations in the torque of the arbor motor 23 rotating the cutting tool 13 as described above or may be calculated from the number of works machined by the cutting tool 13.

Then, the machining shape prediction section 402 calculates, from the machining load data acquired in step ST2, the amount of elastic deformation produced on the work, adds the amount of stress deformation acquired in step ST1 and the calculated amount of elastic deformation to the target shape and predicts the machining shape when the boring machining is performed (step ST3). Then, the motor control section 403 inverts the machining shape predicted in step ST3 with respect to the target shape, controls various types of motors 23, 24 and 32 and performs non-round shape machining on the work (step ST4).

In the present embodiment described above, the following effects are achieved.

When the boring machining is performed on the cast work (cylinder block), the residual stress caused by the machining at the time of casting is released, and thus the accuracy of the machining is lowered. Hence, in the non-round hole machining device 1 of the present embodiment, the amount of stress deformation per part of the cast work is previously provided as the stress deformation amount correspondence table, and thus it is possible to predict how much the cast work is deformed by stress in the boring machining. Then, in the non-round hole machining device 1, the shape is inverted with respect to the target shape only by the previously predicted stress deformation, and the boring machining is performed on the cast work.

In this way, it is possible to cancel out an error based on a stress caused at the time of casting, and thus it is possible to enhance the accuracy of the boring machining. Since it is not necessary to decrease the allowance for the cutting to reduce a stress to be released, it is possible to reduce a cycle time, with the result that it is possible to enhance the productivity.

When the machining using the cutting tool 13 is repeated, the edge of the cutting tool 13 is worn, and thus the accuracy of the machining is lowered. With respect to this respect, in the non-round hole machining device 1 of the present embodiment, various types of motors 23, 24 and 32 are controlled so as to reduce the lowering of the accuracy of the machining caused by the wear, and the non-round shape machining is performed on the work. Specifically, attention is focused on the fact that the lowering of the accuracy of the machining caused by the wear is based on the elastic deformation of the work, the machining load data corresponding to the machining load placed on the edge is acquired and the amount of elastic deformation of the work is calculated from the machining load data. Then, the calculated amount of elastic deformation is added (inverted), the machining is performed on the work and thus the error based on the elastic deformation of the work is cancelled out.

In this way, in the non-round hole machining device 1 of the present embodiment, regardless of the degree of the wear of the edge of the cutting tool 13, it is possible to accurately perform the non-round shape machining. Consequently, it is possible to reduce the frequency of replacement of the edge, and thus it is possible to reduce the cost. Since it is not necessary to decrease the allowance for the cutting according to the degree of the wear of the edge, it is possible to reduce a cycle time, with the result that it is possible to enhance the productivity.

The machining load may be calculated by a predetermined computation from variations in the torque of the arbor motor 23 when the work is machined or may be calculated by providing master data associated with the number of works machined and the machining load and referencing the master data.

When the machining load data is calculated from variations in the torque, it is not necessary to previously prepare the master data, and thus this is preferable. When the machining load data is calculated by referencing the master data, once the master data is prepared, it is possible to automatically perform the machining, and thus this is preferable.

The present invention is not limited to the embodiment described above, and variations, modifications and the like that can achieve the object of the present invention are included in the present invention.

In the present embodiment, the cylinder block serving as the work is fixed, and in this state, the machining head 10 is rotated, and the bore is machined. However, there is no restriction on this configuration. In other words, the bore may be machined by rotating the cylinder block serving as the work without rotating the machining head. The present invention can also be applied to such machining.

EXPLANATION OF REFERENCE NUMERALS 1 non-round hole machining device
10 machining head
13 cutting tool (edge tool)
40 controller
41 main controller
42 synchronization controller
401 stress deformation calculation section
402 machining shape prediction section
403 motor control section
404 machining load data acquisition section

The invention claimed is:

1. A round hole machining method of performing inside diameter machining on a cast work,
wherein first master data storing an amount of residual stress deformation is provided, the residual stress deformation being caused when a residual stress produced per part of the cast work is released by machining, and
the round hole machining method comprises: a step of predicting, in the inside diameter machining, a machining shape of the cast work based on the amount of residual stress deformation read from the first master data; and
a step of performing the inside diameter machining on the cast work such that an inverted shape obtained by inverting the machining shape predicted in the step with respect to a target shape is formed.

2. The round hole machining method according to claim 1 further comprising: a step of acquiring, in the inside diameter machining, machining load data corresponding to a machining load placed on an edge,
wherein in the step of predicting the machining shape of the cast work, the machining shape of the cast work is predicted based on an amount of elastic deformation of the cast work corresponding to the machining load data and the amount of residual stress deformation.

3. The round hole machining method according to claim 2, wherein in the step of acquiring the machining load data, the machining load data is acquired based on a variation in torque when an immediately preceding cast work is machined.

4. The round hole machining method according to claim 2, wherein second master data in which a number of cast works machined is associated with a machining load corresponding to an amount of wear of the edge is provided, and
in the step of acquiring the machining load data, the machining load data is acquired by reading the machining load corresponding to the number of cast works machined from the second master data.

5. The round hole machining method according to claim 1, wherein the inside diameter machining is performed by using an edge tool for boring.

6. A round hole-machining device for performing inside diameter machining on a cast work, the round hole-machining device comprising:
first master data for storing an amount of residual stress deformation that is caused when a residual stress produced per part of the cast work is released by machining;
a machining shape prediction section for predicting, in the inside diameter machining, a machining shape of the cast work based on the amount of residual stress deformation read from the first master data; and
a motor control section for performing the inside diameter machining on the cast work such that an inverted shape obtained by inverting the machining shape predicted with respect to a target shape is formed.

7. The round hole-machining device according to claim 6 further comprising: a machining load data acquisition section for acquiring, in the inside diameter machining, machining load data corresponding to a machining load placed on an edge,
wherein the machining shape prediction section predicts the machining shape of the cast work based on an amount of elastic deformation of the cast work corresponding to the machining load data and the amount of residual stress deformation.

8. The round hole-machining device according to claim 7, wherein the machining load data acquisition section acquires the machining load data based on a variation in torque when an immediately preceding cast work is machined.

9. The round hole-machining device according to claim 7, wherein second master data in which a number of cast works machined is associated with a machining load corresponding to an amount of wear of the edge is provided, and
the machining load data acquisition section acquires the machining load data by reading the machining load corresponding to the number of cast works machined from the second master data.

10. The round hole-machining device according to claim 6, wherein the round hole-machining device is a machining device using an edge tool for boring.

11. The round hole machining method according to claim 2, wherein the inside diameter machining is performed by using an edge tool for boring.

12. The round hole machining method according to claim 3, wherein the inside diameter machining is performed by using an edge tool for boring.

13. The round hole machining method according to claim 4, wherein the inside diameter machining is performed by using an edge tool for boring.

14. The round hole-machining device according to claim 7, wherein the round hole-machining device is a machining device using an edge tool for boring.

15. The round hole-machining device according to claim 8, wherein the round hole-machining device is a machining device using an edge tool for boring.

16. The round hole-machining device according to claim 9, wherein the round hole-machining device is a machining device using an edge tool for boring.

* * * * *